Oct. 6, 1931.  J. M. AUFIERO ET AL  1,826,443

COMMUTATOR AND METHOD OF MAKING THE SAME

Filed Jan. 21, 1929

INVENTORS
John M. Aufiero and John N. Smoot
BY
Duell, Dunn & Anderson
ATTORNEYS.

Patented Oct. 6, 1931

1,826,443

UNITED STATES PATENT OFFICE

JOHN M. AUFIERO, OF BROOKLYN, AND JOHN H. SMOOT, OF NEW YORK, N. Y., ASSIGNORS TO E. A. LABORATORIES, INC., OF BROOKLYN, NEW YORK, A CORPORATION OF NEW YORK

COMMUTATOR AND METHOD OF MAKING THE SAME

Application filed January 21, 1929. Serial No. 334,058.

This invention relates to a commutator, as well as the method of manufacturing the same, and aims to provide an article of this character particularly adapted for use in connection with electric current generators and motors.

It is an object to provide a device of this character the parts of which will be few in number and simple and rugged in construction, these parts being assembled according to the teachings of this invention, and furnishing a commercially desirable article operating over long periods of time with freedom from mechanical or electrical difficulties.

A further object of the invention is that of constructing a commutator which will be of particular utility when employed in connection with generators and motors of the smaller type, as are for example utilized in horns, windshield wipers, fans, etc. In other words, the instant device lends itself to quantity production in which, to the greatest extent, machine operations of an automatic or semi-automatic nature are involved, and by means of the invention a commutator assembly is furnished in which there will be no danger of the several segments shifting with respect to each other, nor with respect to the shaft upon which the commutator body is mounted.

With these, and further, objects in mind, reference is had to the attached sheet of drawings illustrating several practical embodiments of the invention, and in which.

Figure 1:
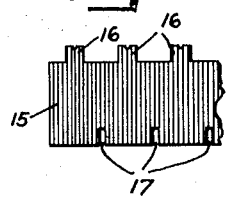
Fig. 1 is a fragmentary plan view of the inner face of a blank from which the commutator segments are formed.
Figure 2:
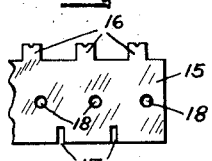
Fig. 2 is a similar view of a second form of blank constructed within the province of the present invention.

In Figs. 1 and 2 a blank has been indicated at 15 which is formed of any suitable conducting material as, for example, copper and which, in the embodiment illustrated has, as an integral part of its body, lugs 16 extending from one of its edges, these lugs or fingers serving, as hereinafter described, to conveniently connect electric leads to the several segments of the commutator. One of the edges of the strip or blank is also formed with a series of slits 17 which, in the embodiment shown, extend only partially across the body of the strip. As will hereinafter appear, however, these slits might be extended to any convenient depth. The inner face of the blank or strip shown in Figure 1 is formed with a series of corrugations or grooves which may be rectangular in cross-section, the advantages of this formation over an ordinary series of V grooves being hereinafter apparent.

Figure 3:
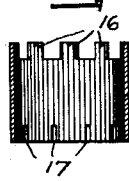
Figs. 3 and 4 show the blanks of Figs. 1 and 2 respectively coiled in the form of cylinders.
Figure 4:
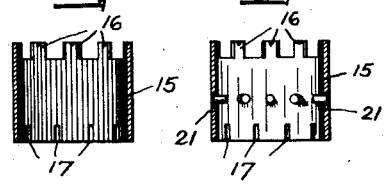

The blank shown in Figure 2 is formed with a series of openings 18 preferably corresponding in number to the number of commutator segments employed. Regardless of the type of strip employed and whether it be formed with both corrugations or openings or with neither, these strips are arranged to provide cylinders, as shown in Figs. 3 and 4. Thereupon, the cylinders are placed in molds, and the interior thereof is filled with a core of insulating material such as "bakelite", which is conveniently molded in place and cured by heat treatment and pressure. Obviously, if the mold (not shown) is provided with a recess adjacent its base the mass of core material 19 will flow, or be expressed through the slits 17 and/or around the lower edge of the cylinder to provide a ring 20 of material adjacent the edge of the cylinder and exteriorly of the same, it being herein noted that the width or depth of this ring is less than the depth of the slits 17, which are cut into the edge of the strip.

Obviously, if corrugations are presented in the inner face of the strip, these corrugations, if initially rectangular in cross-section, will, incident to the bending of the strip into cylinder shape, present a flaring section into which the moldable material will key. If, on the other hand, the openings 18 are utilized, the material will key into these portions to retain the cylinder or the several parts thereof against displacement with respect to the core and if, as has been shown in Figure 4, pins 21 are inserted through these openings prior to the core-forming and applying operation, these pins will extend into the mass of core material to prevent such displacement.

Figure 5:
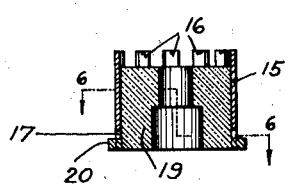
Fig. 5 illustrates the cylinder of Fig. 3 with a core in position.
Figure 7:
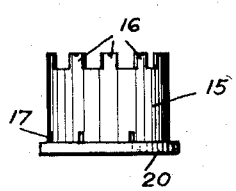
Fig. 7 is a side view of the commutator.
Figure 11:
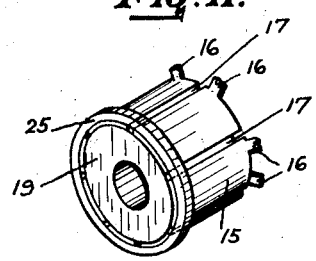
Fig. 11 is a perspective view of the commutator prior to association with the motor shaft.
Figure 12:
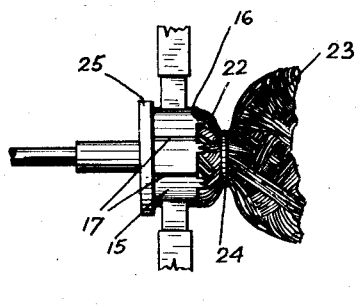
Fig. 12 shows the commutator in association with an armature and shaft.

It will be apparent that both the pins and/or corrugations might be dispensed with in case of the employment of a ring of the nature shown in Figure 5. Likewise, if this ring or its equivalent is not utilized it will, under most conditions, be entirely feasible to dispense with the formation of the slits 17. Conceding such slits have been provided, however, and that the cylinder is retained with respect to the core by: (a) inherent cohesion of the materials; (b) a keying of the core material into grooves or openings formed in or through the cylinder; (c) the use of pins such as 21; (d) the employment of a ring, and (e) a combination of any or all of these several characteristics,—it will be appreciated that the entire unit may now be placed upon a milling machine and the slits continued through to the other edge of the cylinder. Due to the fact that these slits will extend materially beyond the ring 20, it will be obvious that the milling cutter need not contact with this element in that sufficient tolerance is provided at this point and thus no damage will occur to the ring, which will remain as an intact element integral with the core enclosed by the cylinder. Moreover, in this milling operation those portions of the slits 17 which extend beyond the retaining ring will be filled with core material, as has been indicated in Figure 5, so that in the subsequent grinding operation copper threads will not bridge across the gap which, at this point, would present possible difficulties to being subsequently cleaned. When, now, the grinding operation has been completed it will be obvious that a commutator of the nature shown in Figures 11 and 12 is presented and in which the fingers 16 may extend outwardly, as in Figure 11, or parallel to the commutator segments, as in Figure 12. In any event, if it is preferred, as a precautionary matter, to further anchor the inner ends of the segments, the leads 22 of the armature 23 may be encircled by a confining element 24 which will serve to achieve the result desired.

Figure 9:
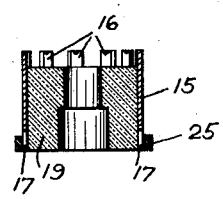
Fig. 9 is a sectional side view of this commutator.
Figure 8:
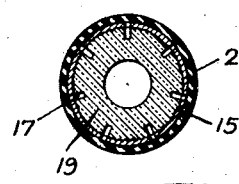
Fig. 8 is a transverse view taken along the lines 8—8 of Fig. 10.

Obviously, as in Figures 8 and 9, the retaining ring 25 may be formed of "bakelite" or of a material different from the core and this element may be added after the core has been disposed within the cylinder and either before or after the milling operation. In the event that the former is the case, however, it will be understood that the preformed slits 17 should extend to a distance sufficient to provide tolerance between the inner edge of the retaining ring and their point of termination. In connection with the thought of utilizing for the retaining ring 25 a substance different from that of the core material, it is presented that "bakelite" is quite brittle and in certain instances the grinding tool or milling cutter might contact with the edge of the same, resulting in chipping. Thus, obviously, other insulating materials having a characteristic different than the material in question might be employed at this point if desired.

Figure 10:
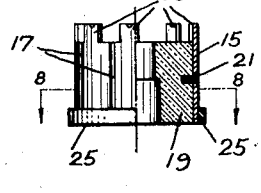
Fig. 10 is a partly fragmentary, sectional side view of the device as shown in Fig. 9.

In connection with the grinding operation it will be appreciated that the commutator is ordinarily affixed to the armature shaft before this step in the method of manufacture and, in fact, in certain instances, before the milling operation. When, now, the commutator carried by this armature shaft is moved at relatively high speed within a grinding machine, all surfaces will be trued up, and as in Figure 10, the heads of the pins 21 will be entirely flush with the operating surfaces of the segments, and if these pins are constructed of identically the same metal as these segments, the wear on all parts should be equal, so that difficulties in this connection will not be experienced.

Figure 6:
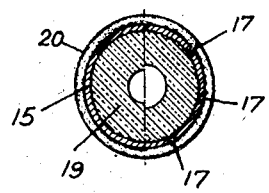
Fig. 6 is a transverse, sectional view taken along the lines 6—6 and in the direction of the arrows of Fig. 5.
Figure 13:
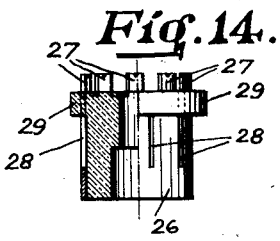
Figs. 13 and 14 are views of a blank and finished commutator, embodying a different and in certain instances preferred form of construction.
Figure 14:
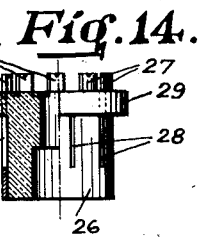

Finally, referring to Fig. 13, it will be observed that a blank has been illustrated which includes a body 26 having arms or fingers 27 to which the leads are to be connected. Slits 28 are formed in this body and extend into that edge from which the fingers extend. Similarly to the previously described blanks, this blank is shaped to provide a cylinder and is introduced into the mold within which it receives "bakelite" or any other suitable insulating material. The mold is so shaped that a certain amount of this material is provided in the form of a ring 29 as shown in Fig. 14, this ring overlying the inner edges of the commutator segments, and, in fact, preferably extending to a certain distance over the connecting fingers or arms. It is obvious with this expedient that the ring will necessarily extend around the free edge of the commutator and form an integral and unitary part of the core. Moreover and during the subsequent soldering operations (incident to connecting the leads with the several segments) this ring will act to limit the flow of the solder. Thus all difficulties in connection with faulty work incident to solder, bridging the gaps between segments and also incident to the solder flowing to a point at which it is liable to be engaged by the grinding tool will be avoided. Moreover, while the commutator segments will with this construction remain in properly applied position, it will be apparent that, if desired, interiorily grooved structure such as has been suggested in Figs. 6 and 8 might be resorted to; openings might be provided as in Fig. 2 and these openings might, if desired, accommodate pins of the nature shown in Fig. 4, all of these expedients serving to retain the segments against relative movement.

From the foregoing it will be understood that, among others, those objects which have been specifically aforementioned are achieved. It will moreover be appreciated, however, that numerous changes in construction, rearrangement of the parts and changes in the steps of the method herein developed might be resorted to without departing from the spirit of the invention as defined by the claim.

Having described our invention, what we claim to be new and desire to secure by Letters Patent is:

A method of forming a commutator which includes providing a strip of metal formed with slits in one of its edges, curving said strip to form a cylinder, placing a mass of insulating material within said cylinder, causing said material to extend beyond said strip in the form of a ring overlying the strip adjacent one edge thereof and covering portions of said slits, and finally in cutting the cylinder in line with said slits and through to the opposite edge of said strip.

In testimony whereof we affix our signatures.

JOHN M. AUFIERO.
JOHN H. SMOOT.